United States Patent [19]

Smith et al.

[11] 4,311,803

[45] Jan. 19, 1982

[54] CONTINUOUS SOLUTION POLYMERIZATION PROCESS

[75] Inventors: Richard L. Smith; Ralph C. Farrar; Richard J. Sonnenfeld, all of Bartlesville, Okla.

[73] Assignee: Phillips Petroleum Company, Bartlesville, Okla.

[21] Appl. No.: 181,516

[22] Filed: Aug. 26, 1980

Related U.S. Application Data

[63] Continuation-in-part of Ser. No. 35,135, May 1, 1979, abandoned.

[51] Int. Cl.$^3$ .............................. C08F 8/00; C08F 8/42; C08C 19/00
[52] U.S. Cl. ............................ 525/53; 525/105; 525/122; 525/130; 525/155; 525/315; 525/342; 525/360; 525/371; 525/384; 525/385; 525/386; 526/64; 526/65; 526/173; 526/174; 526/178; 526/180; 526/181; 526/182
[58] Field of Search ............... 525/53, 105, 155, 130, 525/153, 359, 342, 371, 384, 385, 386, 360, 315, 122; 526/65, 64

[56] References Cited

U.S. PATENT DOCUMENTS

| | | | |
|---|---|---|---|
| T900,023 | 7/1972 | Benjamins | 260/923 |
| 3,035,040 | 5/1962 | Findlay | 260/94.9 |
| 3,099,648 | 7/1963 | Dye | 260/94.3 |
| 3,198,774 | 8/1965 | Hauxtable et al. | 260/83.7 |
| 3,297,793 | 1/1967 | Dollinger | 260/879 |
| 3,356,763 | 12/1967 | Loveless et al. | 260/879 |
| 3,449,306 | 6/1969 | Zelinski | 260/83.7 |
| 3,668,263 | 6/1972 | Morrison et al. | 260/665 |
| 3,668,279 | 6/1972 | Morrison et al. | 260/665 |
| 3,692,874 | 9/1972 | Farrar et al. | 260/880 |
| 3,692,874 | 9/1972 | Farrar et al. | 525/105 |
| 3,776,964 | 12/1973 | Morrison | 260/665 |
| 3,840,616 | 10/1974 | Farrar et al. | 260/827 |
| 3,880,954 | 4/1975 | Kohle et al. | 525/53 |
| 4,091,198 | 5/1978 | Smith et al. | 526/65 |
| 4,136,244 | 1/1979 | Massoubre | 526/174 |
| 4,136,245 | 1/1979 | Massoubre | 526/174 |
| 4,137,391 | 1/1979 | Smith et al. | 526/65 |
| 4,221,884 | 9/1980 | Bi et al. | 525/314 |

FOREIGN PATENT DOCUMENTS 836667 6/1964 Belgium .
1136189 5/1975 United Kingdom .
1528039 10/1978 United Kingdom .

*Primary Examiner*—William F. Hamrock

[57] ABSTRACT

A continuous solution polymerization process for polymerizing conjugated dienes alone or with a copolymerizable monovinylarene in the presence of a gel inhibitor employing a first stirred reactor in series with a following plug-flow tube reactor.

24 Claims, No Drawings

CONTINUOUS SOLUTION POLYMERIZATION PROCESS

This application is a continuation-in-part of application Ser. No. 35,135 filed May 1, 1979, now abandoned.

FIELD OF THE INVENTION

The invention relates to methods of continuous production of conjugated diene polymers including homopolymers and copolymers. In another aspect, the invention relates to the continuous production of random copolymers of a conjugated diene with a monovinylarene. In a further aspect, the invention relates to the continuous polymerization of a conjugated diene alone or with a monovinylarene in a continuous solution process employing a stirred reactor followed by a plug-flow reactor. In another aspect, the invention pertains to a continuous solution polymerization process to achieve essentially quantitative conversion with short residence time to a high Mooney polymer to maximize productivity and minimize gel formation in the stirred reactor.

BACKGROUND OF THE INVENTION

Continuous polymerization of conjugated dienes in the production of homopolymers and copolymers by organolithium initiation in solution polymerization systems offers real production advantages, such as more economic production and more uniform compositions. Process variables can be readily adjusted in a continuous operation so as to optimize operations for a given polymerization recipe. Minor adjustments of monomer feed rates, initiator rates, randomizer rates, temperature control, pressure control, solvent usage, all can be readily made in a continuous process, in effect "fine tuning" so as to maintain relatively consistently a product with optimum properties.

Unfortunately, continuous solution polymerization has the disadvantage of a tendency toward fouling, especially in the first reactor means of the reactor system through a buildup of polymeric materials on the surfaces of the reactor means in contact with the reactants, on heat transfer surfaces, stirring or circulation means, and the like, often ending prematurely a continuous polymerization run. The longer than equipment can be operated on a continuous basis, the more economical the overall results. Having to stop the entire process, clean the equipment, and then start up all over again, means attendant startup problems and necessity to again fine tune the operation. Gel, of course, adversely affects polymer uniformity and quality.

Methods of reducing reactor fouling generally involve the addition of a gel inhibitor to the polymerization system. Gel inhibitors act as slow polymerization poisons which reduce the number of living polymer chains tending to grow and accumulate on the interior surfaces of the polymerization reactor and which otherwise would form high molecular weight gel particles.

Such a gel-inhibitory mechanism, although effective in its intended purpose of inhibiting gel formation, also reduces the total number of nonterminated, live polymer chains otherwise ultimately available at the end of monomer conversion for coupling purposes.

Effective coupling of living polymer chains to form linear or radially branched polymer is important in obtaining polymers having higher molecular weight, broader molecular weight distribution, higher Mooney viscosity, and reduced cold flow, among other aspects.

What is needed is a continuous polymerization process, free of gel, yet providing efficient coupling.

BRIEF SUMMARY OF THE INVENTION

Our invention provides a continuous solution polymerization process which comprises a reactor system in which conjugated diene hydrocarbons alone or with monovinylarene hydrocarbons are polymerized continuously in the presence of a gel inhibitor to reduce reactor fouling. The reactor system comprises a stirred reactor zone connected in series to a contiguous elongated tubular reaction zone.

Our continuous reactor system provides for a shorter residence time required for complete monomer conversion to polymer than can be obtained using a single stirred continuous reactor zone alone or even in two or more stirred continuous reactor zones in series, the reduced residence time manifesting itself in reduced live polymer termination by the gel inhibitor, with the consequence that sufficient live polymer is available for coupling where desired to yield a final polymeric product having the desired improved physical properties.

Our invention also provides a method for improving the coupling efficiency of butadiene/styrene random copolymers prepared according to the continuous polymerization process. The improvement is effected by adding a small amount of 1,3-butadiene as a coupling adjuvant to the living polymer, i.e. the formation of a butadiene cap, at a location in the reactor train prior to the coupling agent inlet.

DETAILED DESCRIPTION OF THE INVENTION

The polymers prepared according to the process of our invention are organolithium-initiated, solution-polymerized, conjugated diene polymers including homopolymers or copolymers, or substantially random conjugated diene/monovinyl aromatic compound copolymers, produced under continuous polymerization conditions employing a reactor system comprising a series of reactor means, sometimes called a train, operated in series.

POLYMERIZATION REACTOR

The system basically comprises a stirred pot means followed by a contiguous plug-flow zone which is a tubular reactor means, and a coupling zone, through which the polymerization reaction mixture flows in its progress of polymerization from initiation to final termination. Presently convenient is a three zone means system connected in series, the first a stirred zone for polymerization, the second a plug-flow zone to finish conversion, and the third a zone for coupling. A minimum of two reactor means can be employed in accordance with the process, a first stirred pot means, and the second means a tubular plug-flow reactor combining a polymerization finishing zone and a coupling zone. The actual number of reactor means through which the polymerization reaction mixture flows in its process of polymerization to final termination is not actually a limiting factor. Of course, it is feasible to use two or more segmented tubular zones of different size to control flow rates, or to permit exposure to different temperatures, or the like, for control of finishing of conversion means versus contact with the coupling agent, and the like. For a given total residence time in the reactor means, two stirred pot reactor means in series produce higher conversion than does a single stirred reactor. Three stirred reactors in series would be expected to result in still higher conversion for a given total residence time, though with diminishing return, and so on. Manipulations, of course, become more complex as more reactor means are added.

The relative sizings and consequent residence times of the stirred pot zone means to the plug-flow zone means can vary widely, depending on such factors as: the extent of conversion in the first reactor means and whether two stirred pots are employed rather than one; whether the stirred pot means is operated full or partially full; the relative mixing capacities involved such as employment of in-line mixers in the tubular polymerization zone as opposed to simple tubular flow; and other factors as will be recognized by one skilled in the art.

On an exemplary basis, we presently suggest as a ratio of capacity of about 15:1 to 1:2 stirred pot:tubular polymerization zone, excluding coupling zone if any.

The first reactor means comprises one or more stirred pots, operated in series where two or more, each of which is provided with a stirring mechanism. The first of the stirred reactors receives the respective monomer or monomers including at least one polymerizable conjugated diene; polymerization diluent; organolithium initiator; a gel inhibitor; a randomizer and/or vinyl promoting agent if desired; and an initiator activator if desired. The organolithium initiator, the gel inhibitor, the randomizer and/or vinyl promoter, and the initiator activator each preferably and conveniently is supplied as a solution in a diluent preferably and conveniently the same as the polymerization diluent. It is readily recognized by one skilled in the art that the randomizer, vinyl promoter, and initiator activator may be one and the same compound, or alternately can be different compounds.

Each of the reactant materials and diluent being employed, together with the coupling agent described below, preferably will have been previously purified as may be necessary in accordance with techniques known to the art. The several polymerization process components should be protected against moisture, air (oxygen), and stray terminating agents such as carbon dioxide, carbon monoxide, and the like. Where necessary, purification can be effected prior to the polymerization step including steps such as distilling, treating with molecular sieves, and the like, as known to the art.

The several materials, other than the coupling agent, are fed to the first of the stirred pot reactor zone in which the reactor contents are maintained with stirring under suitable polymerization conditions of temperature and pressure for proper polymerization of the monomers, utilizing exterior or internal heating/cooling means, and pressurization methods as necessary such as with an inert gas such as nitrogen, and the like. Polymerization initiates in the first reactor means upon addition of the initiator and reaching of suitable polymerization temperature and is allowed to proceed.

The amount of the total monomers converted to polymer in the first stirred reactor where more than one stirred pot is employed can range from about 10 to 95 wt. percent, preferably about 65 to 90 wt. percent, so long as the total conversion reached by the time the stirred pot reactor zone contents discharge into the plug-flow zone is at least about 90 wt. percent. Most preferably, the conversion in the stirred pot reactor zone is very high, preferably at least about 95 wt. percent. Maintaining high conversion in the stirred zone helps avoid gel formation.

The effluent from the stirred pot reactor zone passes into an elongated tubular (plug flow) reaction zone in which the conversion of unreacted monomer or monomers to polymer is essentially quantitatively completed.

The coupling agent may, if desired, be introduced into the elongated, tubular plug-flow zone at that location in the tubular zone wherein the conversion of monomer to polymer is essentially complete. Or, if desired, the polymerization mixture after quantitative conversion, can be passed to a second tubular plug-flow reactor zone, connected in series with the first tubular reactor zone, and the coupling agent there introduced, and polymer termination accomplished.

Where it is desired to add a butadiene cap as a coupling adjuvant prior to coupling, inlet means are needed in the reactor train for adding the 1,3-butadiene to the reaction mixture. Inlet means can be at any point wherein essentially all previously introduced monomers have been converted to living polymer, and prior to the coupling agent inlet means. Normally, a mixing means is incorporated immediately following the coupling adjuvant inlet and prior to the coupling agent inlet, an example of which is a Kenics Static Mixer.

The mixing means incorporated for the purpose of practicing this latter aspect of our invention can be described as an optional reactor means, and is pertinent only to the process in which a butadiene-styrene random copolymer is the polymerization product.

A total of two reactor means are sufficient for the entire polymerization and coupling process, if the second reactor means, that is the tube reactor means, is of adequate capacity (length) to finish quantitative conversion of monomer to polymer at a location in the tube where adequate length remains to allow for coupling adjuvant addition with subsequent polybutadiene cap formation, where employed, and coupling agent addition and subsequent polymer coupling, all of these steps occurring within the second reactor means.

MONOMERS

The polymerization process in accordance with our invention is one of the homopolymerization of one polymerizable hydrocarbon conjugated diene, copolymerization of at least two polymerizable conjugated dienes, or copolymerization of at least one polymerizable conjugated diene and at least one copolymerizable monovinylarene under random polymerization conditions, with the term "polymerizable" referring to solution polymerizable monomers polymerizable with an organolithium initiator.

The polymerizable hydrocarbon conjugated dienes generally contain 4 to 12 carbon atoms per molecule for convenience and availability, those containing 4 to 8 carbon atoms being preferred for commercial purposes, and presently most preferred for this reason are butadiene and isoprene. Examples of the conjugated dienes include 1,3-butadiene and isoprene, as well as 2,3-dimethyl-1,3-butadiene, piperylene, 3-butyl-1,3-octadiene, 2-phenyl-1,3-butadiene, and the like, alone, or in admixture.

As suitable conjugated diene feedstocks, we can employ admixtures of 1,3-butadiene, or of other suitable conjugated dienes, with other low molecular weight hydrocarbons. Such admixtures, termed low concentration diene streams, are obtainable from a variety of refinery product streams such as naphtha-cracking operations or can be intentionally blended compositions, available from product streams produced in a modern petrocomplex of oil refining and petrochemical facilitates. Low concentration diene streams typically may contain such as from less than 30 to more than 50 weight percent of 1,3-butadiene, though the concentration can range widely. Examples of low molecular weight hydrocarbons which typically may be admixed with 1,3-butadiene in the polymerization feed include such as propane, propylene, iso- and n-butane, 1-butane, isobutylene, trans-2-butene, cis-2-butene, vinylacetylene, cyclohexane, and the like.

Hydrocarbon monovinyl-substituted aromatic compound monomers (monovinylarenes) employed in the content of our invention are those known to polymerize with anionic initiators such as organolithium initiators under solution polymerization conditions. These hydrocarbon monovinylarenes typically contain 8 to 20, more usually 8 to 14, carbon atoms per molecule, for commercial purposes. Most preferred is styrene as the most commercially-used monomer. Exemplary species include the presently preferred styrene, as well as 1-vinylnaphthalene, 2-vinylnaphthalene, and various alkyl, cycloalkyl, aryl, alkaryl and aralkyl derivatives thereof, such as α-methylstyrene, 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl)styrene, and the like, alone, or in admixture.

The relative amount of conjugated diene or dienes and monovinylarene or arenes employed for the preparation of the copolymers can vary over a wide range. In preparing rubbery polymers, the proportion of the conjugated diene versus the monovinylarene should be sufficient so as to result in a substantially rubbery or elastomeric copolymer product. There is no exact break point as to the amount of conjugated diene versus monovinylarene that confers rubbery or elastomeric properties on the resulting copolymer, though in general at least 50 parts by weight of conjugated diene are considered to be required on an exemplary basis. Thus, for a rubbery copolymer, as is preferred in accordance with our invention, the weight ratio of conjugated diene to monovinylarene in the monomer charge should be at least 50:50, such as in the range of about 50:50 to 95:5. Of course, mixtures of conjugated dienes as well as mixtures of monovinylarene can be utilized.

In one aspect, our invention provides a method of reducing block polymonovinylarene in the continuous polymerization of conjugated diene/monovinylarene random copolymers. This reduction or minimization of block polymonovinylarene is obtained by adding about 3 to 30, preferably 7-30, more preferably about 10 parts of the conjugated diene charge to the polymerization stream after it leaves the stirred reactor zone and where the conversion has reached 90-95 wt. percent. It is desirable to minimize block polymonovinylarene in these random copolymers since in dynamic applications this tends to optimize hysteresis properties.

ORGANOLITHIUM INITIATOR

Organolithium initiators employed in the process of our invention include the monofunctional and multifunctional types known for solution polymerization of the monomers as described hereinabove. The multifunctional organolithium initiators can be either specific organolithium compounds, or can be multifunctional types which are not necessarily specific compounds but rather represent reproducible compositions of regulable functionality.

The choice of initiator can be governed by the degree of branching and the degree of elasticity desired for the polymer, the nature of the feedstock, and the like. The multifunctional initiator types generally are preferred when a low concentration diene stream is at least a portion of the feedstock since some components present in the unpurified low concentration diene streams may tend to react with carbon-lithium bonds to deactivate initiator activity, thus necessitating the presence of sufficient lithium functionality in the initiator so as to override such deactivation effects.

Among the multifunctional initiators, which are not necessarily specific compounds, are those prepared by reacting an organomonolithium compound with a multivinylphosphine or a multivinylsilane in a diluent such as a hydrocarbon or a mixture of a hydrocarbon and a polar organic compound. The reaction between the multivinylsilane or multivinylphosphine and the organomonolithium compound can result in a precipitate, which can be solubilized if desired, by adding small amounts of a solubilizing monomer such as a conjugated diene or monovinyl aromatic compound, preferably after reaction of the primary components. Alternatively, the reaction can be conducted in the presence of a minor amount of the solubilizing monomer. Relative amounts of the organomonolithium compound and the multivinylsilane or multivinylphosphine preferably should be in the range of about 0.33 to 4 moles of organomonolithium compound per mole of vinyl group present in the multivinylsilane or multivinylphosphine employed.

Exemplary organomonolithium compounds include ethyllithium, isopropyllithium, n-butyllithium, sec-butyllithium, tert-octyllithium, n-eicosyllithium, phenyllithium, 2-naphthyllithium, 4-butylphenyllithium, 4-tolyllithium 4-phenylbutyllithium, cyclohexyllithium, and the like.

Exemplary multivinylsilane compounds include tetravinylsilane, methyltrivinylsilane, diethyldivinylsilane, di-n-dodecyldivinylsilane, cyclohexyltrivinylsilane, phenyltrivinylsilane, benzyltrivinylsilane, (3-ethylcyclohexyl)(3-n-butylphenyl)divinylsilane, and the like.

Exemplary multivinylphosphine compounds include trivinylphosphine, methyldivinylphosphine, dodecyldivinylphosphine, phenyldivinylphosphine, cyclooctyldivinylphosphine, and the like.

Other multifunctional organolithium polymerization initiators can be prepared by reacting an organomonolithium compound with a multivinylaromatic compound and either a conjugated diene or monovinylaromatic compound or both. These ingredients can be charged initially, usually in a diluent which is a hydrocarbon, or a mixture of a hydrocarbon and a polar organic compound as diluent. Alternatively, a multifunctional polymerization initiator can be prepared in a two-step process by reacting an organomonolithium compound with a conjugated diene or monovinyl aromatic compound additive and then adding the multivinyl aromatic compound. Any of the described conjugated dienes or monovinyl aromatic compounds can be employed. The ratio of conjugated diene or monovinylaromatic compound additive employed preferably should be in the range of about 2 to 15 moles of polymerizable compound per mole of organolithium compound. The amount of multivinylaromatic compound employed preferably should be in the range of about 0.05 to 2 moles per mole of organomonolithium compound.

Exemplary multivinyl aromatic compounds include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, 1,3-divinyl-4,5,8-tributylnaphthalene, and the like. Divinyl aromatic hydrocarbons containing up to 18 carbon atoms per molecule are preferred, particularly divinylbenzene as either the ortho, meta, or para isomer, and commercial divinylbenzene, which is a mixture of the three isomers and other compounds such as the ethylstyrene, also is quite satisfactory.

Additional detail describing such multifunctional polymerization initiators is available in U.S. Pat. No. 3,668,263, Morrison et al. (1972) and U.S. Pat. No. 3,776,964, Morrison et al. (1973), each herein incorporated by reference.

Other types of multifunctional initiators can be employed, such as those prepared by contacting a sec- or tert-organomonolithium compound with 1,3-butadiene, in a ratio of such as about 2 to 4 moles of organomonolithium compound per mole of 1,3-butadiene, in the absence of added polar material in this instance, with the contacting preferably being conducted in an inert hydrocarbon diluent, though contacting without the diluent can be employed, if desired.

Alternatively, specific organolithium compounds can be employed as initiators in the preparation of polymers in accordance with our invention. These can be represented by $R(Li)_x$ wherein R represents a hydrocarbyl radical of such as 1 to 20 carbon atoms per group, and x is an integer of 1 to 4. Exemplary organolithium compounds include methyllithium, isopropyllithium, n-butyllithium, sec-butyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

GEL INHIBITOR

Suitable gel inhibitors include such as hydrocarbyl halides, silicon halides, diethylene glycol dimethyl ether, and 1,2-diolefins. Less functional but useful are other agents such as the aromatic hydrocarbons, acetylenics, and amines, having an active hydrogen, as disclosed in U.S. Pat. No. 4,136,244 at col. 4, lines 44 to 68, herein incorporated by reference.

The level of gel inhibitor which is added varies widely, depending on the effectiveness of the specific compound chosen. 1,2-Butadiene is the presently preferred gel inhibitor, and is generally used within the range of about 0.01 to 0.3 phm, more preferably about 0.02 to 0.1 phm.

Silicon halides employed in the polymerization phase in the continuous polymerization process in accordance with the process of our invention can be represented by $R'_n SiX_{4-n}$. The X is halogen and can be chlorine, bromine, or iodine. R' is hydrogen or an alkyl group containing from 1 to 10 carbon atoms. The n is zero or an integer of 1, 2 or 3. When R' is alkyl, it can be normal, secondary or tertiary, though normal alkyl groups are preferred. The value of n is preferably 0 or 1. Thus, the suitable silicon halides include the silicon mono-, di-, tri-, or tetrachloride, bromide, and iodide, such as methyltrichlorosilane, dichlorodimethylsilane, dichlorosilane, trichlorosilane, chlorotrimethylsilane, n-butyltribromosilane, n-decyltriiodosilane, di-sec-butyldichlorosilane, t-amyltribromosilane, trichlorosilane, dibromosilane, iodosilane and the like, alone or in admixture. Any of these can be used alone, or mixtures can be employed, if desired. The presently preferred type for convenience and availability are the silicon tetrahalides, and especially preferred is silicon tetrachloride.

The hydrocarbyl halides and allenes employed in the process of our invention include or can be represented by hydrocarbyl halides such as butyl chloride, butyl bromide, and bromobenzene; and 1,2-diolefins such as 1,2-butadiene, and allene.

RANDOMIZING AGENTS

The organolithium initiated polymerization process in accordance with our invention can employ a mixture of monomers with the polymerization preferably conducted in a hydrocarbon diluent, further with a randomizing agent to substantially avoid formation of substantial block content. The randomizing agent is included in the polymerization reaction mixture. Any suitable polar organic compound known in the art for randomization can be employed for such purposes, including the hydrocarbyl ethers, thioethers, and amines. Such polar compounds, particularly the ethers such as tetrahydrofuran, tend to lead to polymers of substantial vinyl unsaturation content with respect to the portion derived from the conjugated diene monomer.

Where randomization without vinylization or with minimum vinylization is desired, then compounds of other types can be readily employed to produce low vinyl copolymers. Examples of such other types of compounds include the organoalkali metal compounds other than of lithium, such as alkylpotassium compounds such as methylpotassium, ethylpotassium, n-propylpotassium, isopropylpotassium, tert-butylpotassium, tert-amylpotassium, n-hexylpotassium, cyclohexylpotassium, and the like.

Other suitable randomizing agents include the potassium salts of mono- and polyhydric alcohols, mono- and polyhydric phenols, including bis-phenols, and sulfur analogs of same. Specific examples of such compounds include the potassium salts of methyl alcohol, ethyl alcohol, n-propyl alcohol, isopropyl alcohol, tert-butyl alcohol, tert-amyl alcohol, n-hexyl alcohol, cyclohexyl alcohol, benzyl alcohol, phenol, catechol, resorcinol, hydroquinone, pyrogallol, 1-naphthol, 2-naphthol, 2,6-di-tert-butyl-4-methylphenol, ethanethiol, 1-butanethiol, 2-pentanethiol, 2-isobutanethiol, thiophenol, 1,12-dodecanedithiol, 2-naphthalenethiol, cyclohexanethiol, 1,8-octanedithiol, 1,4-benzenedithiol, and the like. Also the potassium salts of 2,2'-methylene-bis(4-methyl-6-tert-butylphenol), 2,2'-isopropylidene-bis(6-cyclohexyl-p-cresol), and the like.

Potassium salts of mono- and polycarboxy acids and sulfur analogs can be employed such as the potassium salts of isovaleric acid, caprylic acid, lauric acid, stearic acid, oleic acid, linolenic acid, cyclopentanecarboxylic acid, phenylacetic acid, benzoic acid, azelaic acid, phthalic acid, 1,8,16-hexadecanetricarboxylic acid, 2-naphthoic acid, hexanedithioic acid, thiolbenzoic acid, and the like.

Examples of suitable potassium carbonates and sulfur analogs include the potassium salts of tert-butylcarbonic acid, n-hexylcarbonic acid, 3,5-dimethylhexylcarbonic acid, n-dodecylcarbonic acid, and the like.

Examples of potassium salts of secondary amines suitable for use as randomizers include the potassium salts of dimethylamine, di-n-butylamine, methyl-n-hexylamine, di(3,5-diethyloctyl)amine, diphenylamine, dibenzylamine, and the like.

Other effective randomizing agents are the hexaalkylphosphoramides employed alone, or employed in conjunction with the above potassium compounds, particularly and preferably with the potassium alkoxides. Examples of compounds of this type include the presently preferred hexamethylphosphoramide, as well as hexaethylphosphoramide, hexa-n-propylphosphoramide, trimethyltrihexylphosphoramide, and the like.

In all references to potassium randomizers aobve, the equivalent sodium, cesium, or rubidium compound can be employed, though potassium compounds and particularly the potassium alkoxides presently are preferred for effectiveness and availability. Thus, we do properly refer to alkali metal, other than lithium, randomizers.

Where desired, particularly in the homopolymerization of a single conjugated diene, or copolymerization of two or more conjugated dienes, and most preferably when polymerizing 1,3-butadiene, a vinyl promoter may be employed. The materials described above as randomizing agents can be and frequently are employed as vinyl promoters.

POLYMERIZATION DILUENT

Polymerization is conducted in a hydrocarbon diluent which can be one or more aromatic, paraffinic, or cycloparaffinic compounds, preferably such as one or more of those containing 4 to 10 carbon atoms per molecule, and which is a liquid under the conditions of the process. Examples include butane, pentane, isooctane, cyclopentane, cyclohexane, benzene, toluene, xylene, ethylbenzene, hexane, and the like, alone or in admixture.

The continuous polymerization process of our invention can be conducted to a wide range of solids concentrating such as 5 to 90 wt. percent, preferably 10 to 25 wt. percent, depending on polymer type, viscosity, temperature, and the like. The process when used for random copolymers presently should be operated at not over about 25 wt. percent solids to avoid reactor fouling.

POLYMERIZATION CONDITIONS

Polymerization temperatures can vary over a broad range, so long as effective. Exemplary temperatures include such as about −20° C. to 150° C., with a presently preferred range of about 30° C. to 125° C. Pressures used should be sufficient to maintain substantially liquid phase conditions in the reaction zone. The temperature in the stirred reactor means presently preferably should be about 30° to 125° C.; the temperature in the tubular reactor means presently preferably should be about 30° to 125° C.; and the temperature in the termination means or zone, presently preferably should be about 30° C. It should be noted that the higher temperatures are more prone to the formation of gel.

When employing a randomizing additive, such as a hexaalkylphosphoramide, hydrocarbyl ether, thioether, or amine, a ratio of moles of randomizer to gram atoms of lithium in the initiator in the range of about 200:1 to 0.01:1, preferably about 100:1 to 0.01:1, is considered exemplary and suitable.

When employing a potassium-containing randomizer, a braod range can be employed such as about 0.25:1 to 100:1 atom ratio Li:K, more preferred about 1:1 to 50:1, again remembering that the "K" also can be any alkali metal other than lithium. It should be kept in mind that a silicon tetrahalide, or other silicon halide employed for purpose of gel suppression, effectively destroys an alkali metal randomizer in the process of addition, and therefore it is necessary to add an amount of such alkali metal randomizer equal to the number of milliequivalents of the silicon halide added for gel suppression, plus the effective amount of randomizer needed to provide effective randomization of the conjugated diene with a monovinyl-substituted aromatic compound desired.

When employing an alternative randomizing additive, such as a hexaalkylphosphoramide, hydrocarbyl ether, thioether, or amine, a ratio of moles of randomizer to gram atoms of lithium in the initiator in the range of about 0.2:1 to 0.01:1, preferably about 0.1:1 to 0.01:1 is considered exemplary and suitable.

COUPLING

As the polymerization reaction mixture passes from the next to the last reactor means in the series, polymerization should be substantially complete. The process is operated in such a manner that the time for polymerization is sufficient to permit substantially complete polymerization by this stage. In the final reactor means of the series, the polymerization admixture is reacted with a coupling agent. Coupling agents are used since the resulting products exhibit an increase in Mooney viscosity as well as other desirable properties.

In our use of the term "coupling" as herein employed, the term is a broad generic term meaning the bringing together and joining by means of one or more central coupling atoms or coupling moieties, two or more of the living lithium-terminated polymer chains.

A wide variety of compounds suitable for such purposes can be employed. Among the suitable coupling agents are the multivinylaromatic compounds, multiepoxides, multiisocyanates, multiimines, multialdehydes, multiketones, multihalides, multianhydrides, multiesters which are the esters of monoalcohols with polycarboxylic acids, and the diesters which are esters of monohydric alcohols with dicarboxylic acids, and the like.

Examples of suitable multivinylaromatic compounds include divinylbenzene, 1,2,4-trivinylbenzene, 1,3-divinylnaphthalene, 1,3-divinylnaphthalene, 1,3,5-trivinylnaphthalene, 2,4-divinylbiphenyl, and the like. The divinylaromatic hydrocarbons are preferred, particularly divinylbenzene in either its ortho, meta, or para isomer. Commercial divinylbenzene which is a mixture of the three isomers and other compounds is quite satisfactory.

While any multiepoxide can be used, we prefer those which are liquid since they are more readily handled and form a relatively small nucleus for the radial polymer. Especially preferred among the multiepoxides are the epoxidized hydrocarbon polymers such as epoxidized liquid polybutadiene and the epoxidized vegetable oils such as epoxidized soybean oil and epoxidized linseed oil. Other epoxy compounds such as 1,2; 5,6; 9,10-triepoxydecane, and the like, also can be used.

Examples of suitable multiisocyanates include benzene-1,2,4-triisocyanate, naphthalene-1,2,5,7-tetraisocyanate, and the like. Especially suitable is a commercially available product known as PAPI-1, a polyarylpolyisocyanate having an average of 3 isocyanate groups per molecule and an average molecular weight of about 380. Such a compound can be visualized as a series of isocyanate-substituted benzene rings joined thorugh methylene linkages.

The multiimines, which are also known as multiaziridinyl compounds, preferably are those containing 3 or more aziridine rings per molecule. Examples of such compounds include the triaziridinyl phosphine oxides or sulfides such as tri(1-aziridinyl)phosphine oxide, tri(2-methyl-1-aziridinyl)phosphine oxide, tri(2-ethyl-3-decyl-1-aziridinyl)phosphine sulfide, and the like.

The multialdehydes are represented by compounds such as 1,4,7-naphthalenetricarboxaldehyde, 1,7,9-anthracenetricarboxaldehyde, 1,1,5-pentanetricarboxaldehyde, and similar multialdehyde-containing aliphatic and aromatic compounds.

The multiketones can be represented by compounds such as 1,4,9,10-anthracenetetrone, 2,3-diacetonylcyclohexanone, and the like.

Examples of the multianhydrides include pyromellitic dianhydride, styrene-maleic anhydride copolymers, and the like.

Examples of the multiesters include diethyladipate, triethylcitrate, 1,3,5-tricarbethoxybenzene, and the like.

Among the multihalides, we presently prefer the silicon multihalides such as silicon tetrachloride, silicon tetrabromide, and silicon tetraiodide, and the trihalosilanes such as trifluorosilane, trichlorosilane, trichloroethylsilane, tribromobenzylsilane, and the like. Also preferred are the multihalogen-substituted hydrocarbons, such as 1,3,5-tri(bromomethyl)benzene, 2,5,6,9-tetrachloro-3,7-decadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2; 4,5-diepoxy-3-hexanone, 1,2; 11,12-diepoxy-8-pentadecanone, 1,3; 18,19-diepoxy-7,14-eicosanedione, and the like.

In addition to the silicon multihalides as described hereinabove, other metal multihalides, particularly those of tin, lead, or germanium, also can be readily employed as coupling and branching agents. Furthermore, silicon or other metal multialkoxides, such as silicon tetraethoxide, are also suitable coupling agents for this invention.

Difunctional counterparts of these agents also can be employed; whereby a linear polymer rather than a branched polymer results.

Broadly, and exemplarily, a range of about 0.01 to 4.5 milliequivalents of coupling agent are employed per 100 grams of monomer, presently preferred about 0.01 to 1.5 to obtain the desired Mooney viscosity. The larger quantities tend to result in insufficient coupling and polymers containing terminally reactive groups. The smaller quantities tend to result in insufficient or at least incomplete coupling of available polymer-Li species. One equivalent of treating agent per equivalent of lithium is considered optimum amount for maximum branching where maximum branching is the desired result in the polymer production line. There are situations where excess coupling agent may be deliberately added to force complete termination of polymer present. The coupling agent can be added in hydrocarbon solution, e.g., in cyclohexane, to the polymerization admixture in the final reactor with suitable mixing for distibution and reaction.

OPTIONAL USE OF COUPLING ADJUVANT

The amount of 1,3-butadiene to be added as a coupling adjuvant or coupling accelerator is preferred to be in the range of at least about one mole of 1,3-butadiene for each equivalent of lithium attached to the terminal moiety derived from a vinyl-substituted aromatic compound. A small excess often can be employed, although as a working broad range we prefer not less than about 0.5 moles of 1,3-butadiene, up to about 20, more preferably 0.5 to 10, more usually 1 to 10, most preferably near 1 mole of 1,3-butadiene per equivalent of lithium. This added 1,3-butadiene provides greater coupling efficiency of the butadienyllithium compared to styryllithium due to the difference in steric hindrance of these two terminal groups.

POLYMER RECOVERY

As is commonly practiced in polymerization process, it is preferable to add an antioxidant to the effluent from the final reactor to retard potentially deleterious effects of contact with oxygen. A typical antioxidant is 2,6-di-t-butyl-4-methylphenol, and an exemplary amount is in the range of about 0.5 to 1 part by weight per hundred parts monomers.

The reaction mixture is treated to destroy residual carbon-lithium bonds which may be present and to recover the polymer. Thus, the polymer can be precipitated and the remaining lithium moieties, if any, inactivated by the addition of such as a lower alcohol, such as isopropyl alcohol, followed by separation of the product polymer from the polymerization diluent and residue by means such as decantation, filtration, centrifugation, or steam stripping, together with removal of volatiles at reduced pressure and moderate temperature such as about 60° C.

The polymers can be compounded with a variety of ingredients including fillers, dyes, pigments, curing or crosslinking agents, softeners, reinforcing agents, and the like, in various compounding operations.

The rubbery polymers produced in accordance with the invention have utility in applications where synthetic and natural rubbers are employed, and can be manufactured or formed into a variety of finished articles, by molding, extruding, or the like. The rubbery random copolymers made in accordance with our invention have particular application as tire tread and sidewall stock.

EXAMPLES

The examples provided are intended to assist one skilled in the art to an understanding of the invention. The examples are directed to those skilled in the art.

Particular species employed, particular conditions, relationships, and the like, are designated to be illustrative, and not limitative of the reasonable scope of the invention and variations thereof.

The equipment employed comprised a reactor train consisting of a stirred pot reactor means, a tubular plug-flow reactor means, and a coupling reactor means. The three reactor means were connected in series with ⅜ or ½ inch outside diameter stainless steel conduits of minimal length to combine the three reactor means as a continuous reactor train. The first two reactors were maintained at 85°–120° C. both by heating all of the feeds (except the initiator solution since it will decompose upon heating) and by heating the reactors externally. The styrene, butadiene, cyclohexane, a cyclohexane solution of the initiator, a cyclohexane solution of the randomizer, and a cyclohexane solution of the gel inhibitor, were purified, prior to use, by individually appropriate technique known to the art, such as alumina beds, mole sieves, distillation, and the like. The reagents were fed to the first stirred reactor, by pumping from respective reservoirs. For copolymer preparation, butadiene and styrene were blended with hot cyclohexane to form a hot mixture just prior to introduction into the bottom of the first reactor via a common line. The randomizer, tetrahydrofuran, and the gel inhibitor, 1,2-butadiene, were delivered to the first reactor through the monomer/solvent line.

The first reactor was either (a) a 3-pint, round-bottomed glass flask, or (b) a 250-ml stainless steel reactor. Each was equipped with a stirring means, and each was jacketed by a controlled temperature oil or water bath.

The second reactor means was either (a) two 20 foot long, ½ inch outside diameter copper tubes in series coiled in such a manner so that each could be practically immersed in an individual oil or water bath of controlled temperature; or (b) a 25-ml capacity Kenics Static Mixer ®, as described in one or other of U.S. patents such as U.S. Pat. Nos. 3,286,992; 3,664,638; 3,704,006; 3,775,063; 3,800,985; and 3,806,097, and jacketed by a controlled temperature oil or water bath.

The coupling agent was introduced into the conduit connecting the tubular reactor means and the coupling reactor means, which conduit was (a) a 5 foot long, ½ inch outside diameter stainless steel tube, or (b) a 425-ml Kenics Static Mixer ®. The coupling reactor means was not provided with temperature control and so was allowed to operate at ambient conditions. A variable flow, metering gear pump (20 liters per hour maximum capacity), located immediately following the coupling agent inlet and prior to the coupling reactor means, served to move the polymer cement and to provide some mixing.

Approximately 0.5 to 1 phr (part by weight per one hundred parts by weight rubber) of 2,6-di-t-butyl-4-methylphenol in isopropyl alcohol solution as anti-oxidant was added to the effluent from the third reactor means. The polymer was coagulated in isopropyl alcohol, collected by decantation, and volatiles removed under reduced pressure at approximately 60° C.

EXAMPLE I

Continuous Polymerization of Polybutadiene

The reactor train employed a 3-pint, round-bottomed glass reactor with stirring means, two 20 feet by ½ inch copper tubes, and a gear pump with connected 5 feet by ½ inch stainless steel tube. Polymerization Recipe I was used for the preparation of medium vinyl poly(1,3-butadiene):

| Polymerization Recipe I | | |
|---|---|---|
| Butadiene | 100 | phm[a] |
| Cyclohexane | 900 | phm |
| Initiator[b] | 2 | meqhm[c] |
| 1,2-Butadiene | 0.2 | phm |
| Tetrahydrofuran | 13 | phm |
| Silicon tetrachloride | 1.26 | meqhm |
| Temperature (Reactor means 1 and 2)[d] | 85° C. | |
| Pressure: | | |
| Reactor means 1 | 110 | psig |
| Reactor means 2 | 105 | psig |
| Reactor means 3 | 100 | psig |
| Average residence time: | | |
| Reactor means 1 | 11.6 | minutes |
| Reactor means 2[d] | 15.3 | minutes[e] |
| Reactor means 3 | approx. 2 | minutes |

[a]phm = Parts by weight per 100 grams of total monomer.
[b]A 1,3-butadiene solubilized multilithium initiator prepared by tumbling a mixture of 420 ml cyclohexane, 0.258 mole 1,3-butadiene, 24 mmoles of mixed isomers of divinylbenzene, and 75 mmoles n-butyllithium at 70° C. for 40 minutes, followed by dilution with cyclohexane to a concentration of 0.145N as determined by hydrolysis and titration with standard acid.
[c]meqhm = Gram milliequivalents per 100 grams of total monomer.
[d]The third reactor means was not heated, and the temperature varied through the third reactor means from an estimated 40° C. to an estimated 80° C.
[e]The residence time was 7.5 minutes in the first 20 foot tube of the second reactor means (including the conduit from the first to the second reactor means) and 7.8 minutes for the second 20 foot tube and the conduit leading to the third reactor means, for a total of 15.3 minutes for the entire second reactor means. The conduit is distinguished in our terminology from the tubular reactor only in that the conduit was not totally within the constant temperature bath.

TABLE I

| | Polybutadiene Properties | |
|---|---|---|
| | Uncoupled Polymer | Coupled Polymer |
| Inherent viscosity[a] | 1.43 | 2.49 |
| Molecular weight ($M_w$)[b] | 182,000 | 672,000 |
| Molecular weight ($M_n$)[b] | 79,000 | 141,000 |
| Heterogeneity Index[c] | 2.3 | 4.8 |
| Mooney viscosity, ML-4[d] | 13 | 82 |

[a]Inherent viscosity was determined according to the procedure given in U.S. Pat. No. 3,278,508, column 20, Note a, with the modification that the solution was not filtered through a sulfur absorption tube but rather a sample of the solution was filtered through a fritted glass filter stick of grade C porosity and pressured directly into the viscometer.
[b]Molecular weights were determined from gel permeation chromatography curves by a procedure described by Gerard Kraus and C. J. Stacy, J. Poly. Sci.: Symposium 43, 329–343 (1973).
[c]Ratio of $\frac{M_w}{M_n}$.
[d]ASTM D1646-74.

The conversion of monomer to polymer, as determined from weight percent solids in the polymerization effluent, was 90.5% complete in the first reactor means, and the conversion became quantitative (100%) while traversing the first 20 foot tube of the second reactor means. Quantitative conversion, therefore, required 19.1 minutes (11.6 minutes in first reactor means plus 7.5 minutes in first section of second reactor means; see footnote e, Polymerization Recipe 1).

The results in Table I illustrate that continuously produced polymer with 100% conversion of monomer to polymer can be effectively coupled to give polymer having a significantly higher molecular weight, broader molecular weight distribution as shown by the higher heterogeneity index, and higher ML-4 Mooney viscosity than the uncoupled base polymer.

EXAMPLE II

Calculated Comparative Example

From the observed percent conversion of monomer to polymer in the first reactor means of the previous example, and the average residence time therein, calculations using the kinetics equation $$Z = 1 \left( \frac{1}{1 + kt} \right)^n$$

wherein
- z = fraction of monomer converted
- k = apparent rate constant
- t = average residence time
- n = number of reactors in series provide means of determining the time required to reach quantitative conversion in one stirred reactor, or two stirred reactors in series. Table II summarizes these calculations.

TABLE II

| Reactor Train[a] | Time to 99.5T[b] Conversion, minutes |
|---|---|
| One stirred reactor plus tube reactor[c] | 19.1[c] |
| Two stirred reactors in series | ≧32.4 |
| One stirred reactor | ≧243 |

[a]Reactors in series.
[b]99.5% conversion considered to be essentially quantitative in order to utilize the kinetics equation which is not adaptable to 100% conversion, i.e. Z = 1. This kinetics equation can be readily derived from known equations given in the book "Chemical Reactor Theory", Kenneth Denbigh, Cambridge University Press, 1965.
[c]Data of instant invention; see Polymerization Recipe 1.

Results in Table II demonstrate the shorter time required to reach quantitative conversion utilizing the process of the instant invention versus other polymerization processes known in the art. The shorter time to reach quantitative conversion reduces the amount of living polymer which is terminated by the gel inhibitor, allowing for effective polymer coupling and consequent improved coupled polymeric properties.

EXAMPLE III

Continuous Polymerization of Butadient-Styrene Random Copolymer

Random copolymer was prepared using a reactor train consisting of a 250-ml. stainless steel reactor with stirring means, a 25-ml. Kenics Static Mixer ®, and a gear pump followed by a 425-ml. Kenics Static Mixer ®, and Polymerization Recipe 2.

| Polymerization Recipe II | | |
|---|---|---|
| Butadiene | 75 | phm[a] |
| Styrene | 25 | phm |
| Cyclohexane | 670 | phm |
| Initiator[b] | 1.2 | meqhm[c] |
| 1,2-Butadiene | 0.05 | phm |
| Tetrahydrofuran | 1.0 | phm |
| Silicon tetrachloride | 0.8 | meqhm |
| Temperature (Reactor means 1 and 2)[d] | 120° C. | |
| Pressure | | |
| Reactor means 1 | 110 | psig |
| Reactor means 2 | 105 | psig |
| Reactor means 3 | 100 | psig |
| Average residence time | | |
| Reactor means 1 | 4.0 | minutes |
| Reactor means 2 | 1.0 | minutes |
| Reactor means 3 | 7.3 | minutes |

[a]Parts by weight per 100 grams of total monomer.
[b]A 1,3-butadiene solubilized multilithium initiator prepared by tumbling a mixture of 420 ml cyclohexane, 0.258 mole 1,3-butadiene, 24 mmoles of mixed isomers of divinylbenzene, and 75 mmoles n-butyllithium at 70° C. for 40 min. followed by dilution with cyclohexane to a concentration of 0.145 N based on lithium and determined by hydrolysis and titration with standard acid.
[c]Gram milliequivalents per 100 grams of total monomer.
[d]The third reactor means was not heated, and the temperature varied through the third reactor means from an estimated 40° C. to an estimated 80° C.

Properties of the butadiene-styrene random copolymer prepared according to Polymerization Recipe 2 are shown in Table III:

TABLE III

| Butadiene-Styrene Random Copolymer Properties | |
|---|---|
| Inherent viscosity | 2.41 |
| Molecular weight ($M_w$) | 511,000 |
| Molecular weight ($M_n$) | 176,000 |
| Heterogeneity index | 2.9 |
| Mooney viscosity, ML-4, uncoupled polymer | 88 |
| Mooney viscosity, ML-4, coupled polymer | 106 |

The conversion of monomer to polymer, as determined from weight percent solids in the polymerization effluent, was 93% complete in the first rector means, and was essentially quantitative (99.9%) after the second reactor means. Quantitative conversion, therefore, required 5.0 minutes.

It is evident from the data in Table III that the continuous polymerization process of the instant invention provides for essentially quantitative conversion of monomer to polymer in a short residence time with sufficient live polymer present at the end of the polymerization process to couple, as shown by a significant increase in Mooney viscosity.

EXAMPLE IV

A series of 75/25 butadiene/styrene random copolymers were prepared according to Polymerization Recipe III by a continuous polymerization process using a reactor train consisting of a 3-pint, round bottomed glass reactor with stirring means, a 20 feet by ½ inch copper tube, and inlet for the 1,3-butadiene coupling adjuvant, a 65-ml. Kenics Static Mixer, a silicon tetrachloride inlet, a gear pump to move the polymer cement and to provide some mixing of the silicon tetrachloride coupling agent with the polymer cement, and a 425-ml. Kenics Static Mixer.

| Polymerization Recipe III | | |
|---|---|---|
| 1,3-Butadiene | 75 | phm[a] |
| Styrene | 25 | phm |
| Cyclohexane | 655 | phm |
| Initiator[b] | 1.98 | mehm[c] |
| 1,2-Butadiene | 0.04 | phm |
| Tetrahydrofuran | 8.00 | phm |
| 1,3-Butadiene (coupling adjuvant) | Variable | |
| Silicon Tetrachloride | Variable | |
| Temperature (Reactor means 1 and 2)[d] | 120 C. | |
| Pressure | | |
| Reactor means 1 | 110 | psig |
| Reactor means 2 | 105 | psig |
| Reactor means 3 | 105 | psig |
| Reactor means 4 | 100 | psig |
| Average residence time | | |
| Reactor means 1 | 3.0 | minutes |
| Reactor means 2 | 3.6 | minutes |
| Reactor means 3 | 0.4 | minutes |

-continued

| Polymerization Recipe III | |
|---|---|
| Reactor means 4 | 2.5 minutes |

<sup>a</sup>Parts by weight per 100 grams of total monomer.
<sup>b</sup>A 1,3-butadiene solubilized multilithium initiator prepared by tumbling a mixture of 420 ml cyclohexane, 0.258 mole 1,3-butadiene, 24 mmoles of mixed isomers of divinylbenzene, and 75 mmoles n-butyllithium at 70° C. for 40 min. followed by dilution with cyclohexane to a concentration of 0.145 N base on lithium and determined by hydrolysis and titration with standard acid.
<sup>c</sup>Gram milliequivalents per 100 grams of total monomer.
<sup>d</sup>The third reactor means was not heated, and the temperature varied through the third reactor means from an estimated 40° C. to an estimated 80° C.

The Mooney viscosities of polymers prepared with and without added butadiene coupling adjuvant, and with varying levels of silicon tetrachloride coupling agent are shown in Table IV:

TABLE IV

Influence of Coupling Adjuvant on Mooney Viscosity of 75/25 Butadiene/Styrene Random Copolymers

| Polymer Identification<sup>a</sup> | Butadiene cap, phm | Silicon Tetrachloride, mehm | Mooney Viscosity, ML-4<sup>b</sup> |
|---|---|---|---|
| A | 0 | 1.0 | 73 |
| B | 0.5 | 1.0 | 94 |
| C | 0 | 1.2 | 83 |
| D | 0.5 | 1.2 | 109 |
| E | 0 | 1.4 | 90 |
| F | 0.5 | 1.4 | 113 |

<sup>a</sup>Prepared according to Polymerization Recipe III.
<sup>b</sup>ASTM D1646-74.

These data illustrate that the addition of a small butadiene cap prior to coupling with silicon tetrachloride in the continuous polymerization of butadiene/styrene random copolymer results in an inrease in Mooney viscosity of about 20 units.

The disclosure, including data, illustrate the value and effectiveness of our invention. The examples, the knowledge and background of the field of the invention, and general principles of chemistry and other applicable sciences have formed the bases from which the broad descriptions of the invention including the ranges of conditions and generic groups of operant components have been developed, which have formed the bases for our claims here appended.

We claim:

1. A continuous process for the preparation of a rubbery substantially gel-free and block poly(-monovinylarene)-free random copolymer of at least one conjugated diene hydrocarbon with at least one hydrocarbon monovinylarene, wherein monomers comprising at least one polymerizable conjugated diene and at least one copolymerizable monovinylarene, an organolithium initiator, diluent, gel inhibitor, and at least one randomizing agent in an amount sufficient to substantially randomize the copolymerization of said conjugated diene with said monovinylarene, are fed substantially continuously to a stirred pot reactor zone wherein said monomers are polymerized under solution polymerization conditions of diluent, temperature, and pressure, to a conversion of at least about 90 weight percent, the resulting polymerization admixture moves substantially continuously into a plug flow zone, and about 3–30 parts per hundred parts monomer of said conjugated diene monomer charge are added to said polymerization admixture upon discharge from said stirred reactor zone to said plug flow zone, wherein in said plug flow zone the polymerization reaction mixture moves substantially continuously and conversion of remaining monomers, if any, essentially completes, and treating the fully converted polymerization reaction admixture with an effective amount of a coupling agent, thereby producing said rubbery block poly(-monovinylarene)-free coupled random copolymer continuously.

2. The process according to claim 1 wherein the amount of said conjugated diene charge added to said admixture is about 7–30 parts.

3. The process according to claim 1 wherein the amount of said conjugated diene charge added to said admixture is about 10 parts.

4. The process according to claim 1 wherein said conjugated diene contains 4 to 12 carbon atoms per molecule, and said copolymerizable monovinyl aromatic compound contains 8 to 20 carbon atoms per molecule.

5. The process according to claim 4 wherein said conjugated diene is 1,3-butadiene, isoprene, 2,3-dimethyl-1,3-butadiene, piperylene, 3-butyl-1,3-octadiene, 2-phenyl-1,3-butadiene, or mixture, and wherein said monovinylaromatic compound is styrene, 1-vinylnaphthalene, α-methylstyrene, 2-vinylnaphthalene, 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl)styrene, or mixture.

6. The process according to claim 5 wherein said polymerization represents the copolymerization of about 50 to 95 parts by weight of said conjugated diene and about 5 to 50 parts by weight of said monovinylarene.

7. The process according to claim 6 wherein said gel inhibitor is at least one hydrocarbyl halide, silicon halide, diethylene glycol diethyl ether, or compounds containing active hydrogen and selected from the group consisting of aromatic hydrocarbons, acetylenics, 1,2-diolefins, and amines.

8. The process according to claim 7 wherein said gel inhibitor is a silicon halide and is represented by $R_nSiX_{4-n}$ wherein each X is halogen, each R is hydrogen or alkyl of 1 to 10 carbon atoms, and n is 0, 1, 2, or 3.

9. The process according to claim 8 wherein said silicon halide is methyltrichorosilane, dichlorodimethylsilane, chlorotriethylsilane, n-butyltribromosilane, n-decyltriiodosilane, di-secbutyldichlorosilane, t-amyltribromosilane, trichlorosilane, dibromosilane, iodosilane, silicon di-, tri-, or tetra- bromide, chloride, or iodide, or mixture.

10. The process according to claim 7 wherein said conjugated diene is provided, at least in part, by a low concentration diene stream.

11. The process according to claim 7 wherein said organolithium initiator is a multifunctional species or compound.

12. The process according to claim 7 employing said organolithium initiator in an amount sufficient to provide about 0.2 to 5 milliequivalents of lithium per 100 grams of monomer.

13. The process according to claim 12 wherein said randomizing agent is a polar organic compound and is at least one of an ether, thioether, amine, potassium salt of mono- or polyhydric alcohol, mono- or polycarboxylic acid, mono- or polyhydric phenol, or S-analogs, or a hexaalkylphosphoramide.

14. The process according to claim 13 wherein said randomizing agent is a said ether, and is employed in an amount sufficient to provide about 200:1 to 0.01:1 ether:Li molar ratio.

15. The process according to claim 14 wherein said conjugated diene is butadiene, said monovinylarene is styrene, said hydrocarbon diluent comprises cyclohexane, said organolithium initiator is a 1,3-butadiene-solubilized multilithium initiator prepared from divinylbenzene and n-butyllithium, said randomizer is tetrahydrofuran, said gel inhibitor is a silicon halide and is silicon tetrachloride, and said coupling agent is silicon tetrachloride.

16. The process according to claim 1 wherein said coupling agent is a multivinylaromatic compound, multiepoxide, multiisocyanate, multiimine, multialdehyde, multiketone, multianhydride, multiester of a polycarboxylic acid with a monoalcohol, multihalide, multialkoxides, or diester of a monohydric alcohol with a dicarboxylic acid, and said coupling employs about 0.01 to 4.5 milliequivalents of said coupling agent per 100 grams of monomer employed in said polymerization.

17. The process according to claim 16 wherein said coupling employs said multihalide and is a silicon, lead, germanium, or tin multihalide, or silicon multialkoxide, employed in an amount sufficient to provide about 0.01 to 1.5 milliequivalents of coupling agent per 100 grams of monomer.

18. The process according to claim 17 wherein said coupling employs a multihalide which is silicon tetrachloride.

19. The process according to claim 16 further employing after polymerization is substantially complete and prior to said coupling agent addition, a supplementary addition of a minor amount of 1,3-butadiene as a capping step to promote the subsequent coupling.

20. The process according to claim 6 operating said polymerization stirred zone at a solids concentration of about 5 to 90 weight percent.

21. The process according to claim 20 operating said polymerization stirred zone at a solids concentration of about 10 to 25 weight percent.

22. The process according to claim 21 wherein said solution polymerization conditions include a polymerization temperature of about $-20°$ C. to $150°$ C.

23. The process according to claim 1 wherein said stirred polymerization zone represents a volume capacity ratio of about 15:1 to 1:2 relative to said tubular polymerization zone.

24. The process according to claim 14 wherein said conjugated diene is butadiene, said monovinylarene is styrene, said hydrocarbon diluent comprises cyclohexane, said organolithium initiator is a 1,3-butadiene-solubilized multilithium initiatior prepared from divinylbenzene and n-butyllithium, said randomizer is tetrahydrofuran, said gel inhibitor is a 1,2-diolefin and is 1,2-butadiene, and said polymerization after substantially complete conversion further is terminated with silicon tetrachloride.

* * * * *